Jan. 4, 1949. R. J. HULL ET AL 2,457,897
TIRE AND ATTACHABLE VANE THEREFOR
Filed Feb. 12, 1944
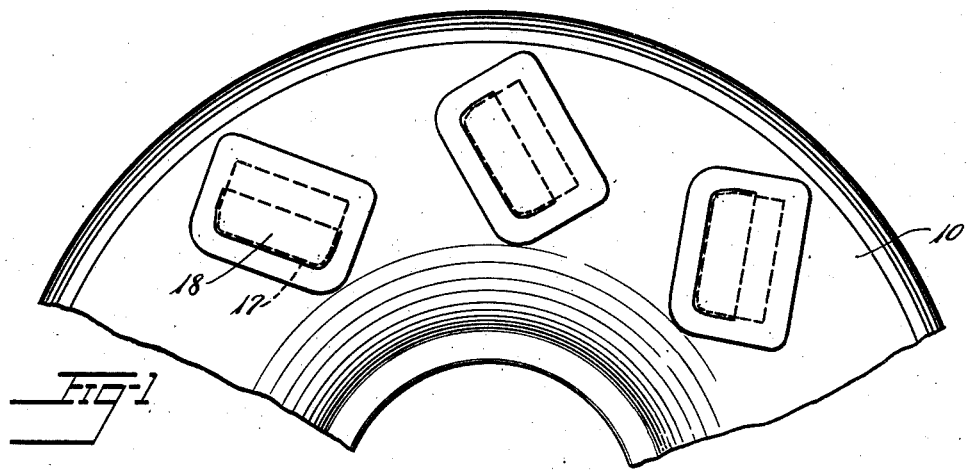
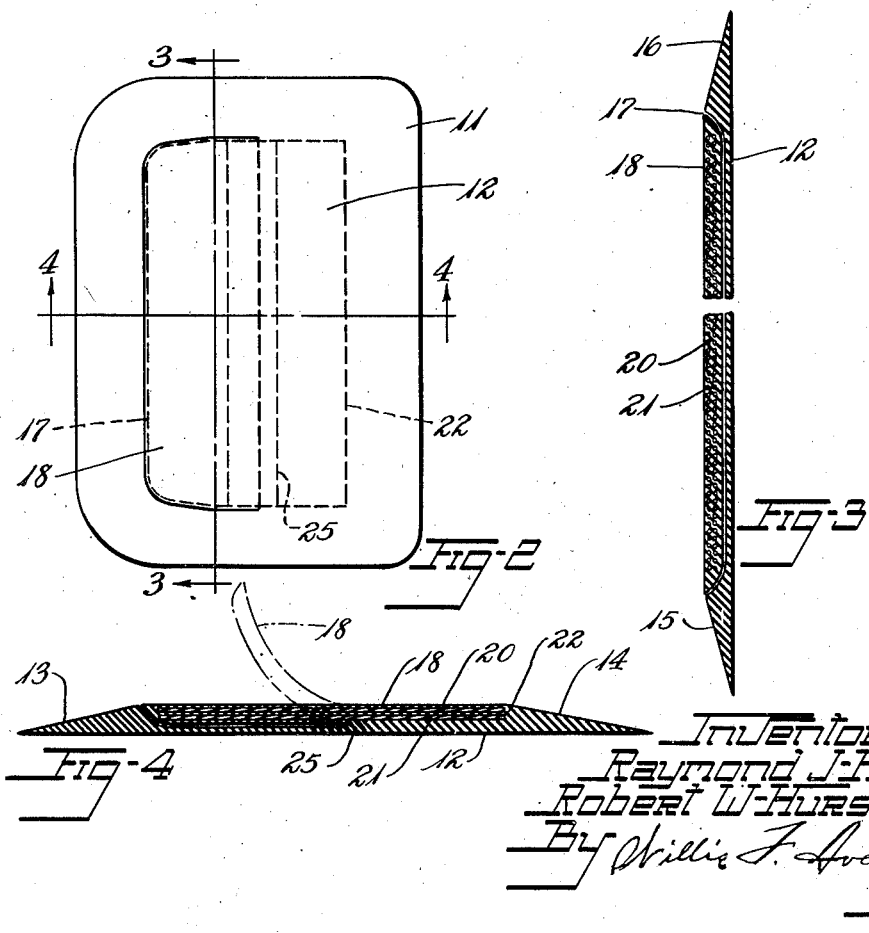
Inventors
Raymond J. Hull
Robert W. Hursh
By Willis F. Avery
Atty.

Patented Jan. 4, 1949

2,457,897

UNITED STATES PATENT OFFICE 2,457,897

TIRE AND ATTACHABLE VANE THEREFOR

Raymond J. Hull and Robert W. Hursh, Akron, Ohio, assignors to The B. F. Goodrich Company, New York, N. Y., a corporation of New York Application February 12, 1944, Serial No. 522,074

2 Claims. (Cl. 244—103)

This invention relates to tires having vanes thereon and to attachable vanes therefor and is especially useful with relation to tires for aircraft where rotation of the tires in flight is desired.

The principal objects of the invention are to provide an attachable vane which may be applied to a vulcanized or an unvulcanized tire, to provide a vane which may be attached to a tire at any desired position or at any desired angular relation, and to provide a unitary article of manufacture.

A further object is to provide for effective flexing action of the vane while at the same time providing for a strong attachement not subject to loosening either as a result of flexure of the tire or flexure of the vane.

These and other objects will appear from the following description and the accompanying drawings.

Of the drawings:

Fig. 1 is a side view of a portion of a tire with vanes attached thereto in accordance with and embodying the invention, parts of the tire being broken away, Fig. 2 is a face view of one of the vane units, Fig. 3 is a cross-section thereof, taken on line 3—3 of Fig. 2, parts being broken away, and Fig. 4 is a cross-section thereof, taken on line 4—4 of Fig. 2, the deflected position of the vane being indicated in dot-and-dash lines.

Referring to the drawings, a tire casing 10, has on its opposite sidewalls at circumferentially spaced-apart positions vane units 11, one of which is shown to a larger scale in Fig. 2. Each vane unit has a substantially flat base body 12 of soft vulcanized rubber or other rubber-like material having wide margins 13, 14, 15, 16 tapering in thickness to thin edges. A recess 17 is formed in the center of the exposed face of the unit. A vane 18 is formed integrally with the unit and is united thereto at one margin, its other margins being unsecured. The arrangement is such that the vane occupies the recess 17 but may be deflected therefrom by flow of air, as indicated in dot-and-dash lines in Fig. 4, to a position where it stands at an acute angle to the sidewall of the tire, and the wide margins of the base of the unit provide a broad anchorage area throughout the area of the unit while the tapered edges provide progressively increased stretchability away from the position of anchorage of the vane so that forces tending to peel the unit from the tire casing are dissipated and not concentrated at the edges. The base portion of the unit may be thus securely attached throughout its area to the portion of the tire it overlies, and the vane portion is capable of flexing relative to the base portion with which it is integrally united, so that strength is provided both at the juncture of the vane portion with the base portion and at the attachment of the base portion with the tire, although the unit as a whole is applied to only a localized area of the tire.

For reinforcing the vane, a plurality of plies 20, 21 of unwoven parallel cords or cord fabric are completely embedded in the rubber material and extend from one free margin of the vane across the hinge line at the opposite margin of the vane and into the material of the base to a position 22 short of the margin of the body. The cords of the plies 20, 21 which, as will be seen in Figs. 3 and 4, are weftless so as to be separable laterally are preferably arranged parallel to each other with all of the cords preferably at right angles to the hinge line. The arrangement is such that when the unit is in position on a curved sidewall of the tire so that the hinge line is curved, the cords permit hinging of the vane by fan-wise spreading thereof as permitted by the elasticity of the rubber-like material.

The vane units 11 are prepared as separate vulcanized articles and then arranged about the sidewalls of the tire and vulcanized thereto either in succession or as a group, and may be arranged about the sidewalls at any desired position or angular relation thereto but preferably with its hinge line oblique to a radius of the tire as shown in Fig. 1.

In the manufacture of the vane unit, the rubberized plies of cord material 20, 21 are enclosed by a protective sheet of rubber material. A piece of Holland cloth to separate the vane from the base is adhered over a portion of the under face of the assembled vane and a strip 25 of rubber composition is folded about the edges of the Holland cloth at the hinge line to secure the Holland cloth and to provide against separation of the rubber material at the hinge line in use. The assembly is then adhered to one face of a slab of rubber-like material larger than the vane for providing the base or body 12. The assembly is then placed in a vulcanizing press against a heated platen with a pressure bag at the opposite face and pressure applied thereto. Due to the flow of the rubber material during vulcanization, the vane is embedded in the body and the margins of the body flow outwardly to form the tapered margins. After vulcanization the unit is removed from the press and the Holland cloth, which preserves the separation of the vane and the body, is removed. The attaching face of the unit is then buffed and cemented and the unit is ready for use.

The unit may be applied to a vulcanized tire by buffing the sidewalls of the tire over the desired area of application and then cementing the area of the sidewall. If desired a thin layer of unvulcanized rubber may be applied over the cemented area. The vane unit is then applied and rolled in place. That portion of the sidewall which supports the vane may then be clamped between a heated platen applied over the vane unit and a supporting platen or inflatable curing bag to vulcanize the vane unit to the tire.

Alternately a tire with a set of vane units applied thereto may be placed in a curing mold and all of the units vulcanized to the tire simultaneously.

Where the tire has not previously been vulcanized, the tire may be vulcanized and the vane units vulcanized thereto in a single operation.

The vane unit may be employed to replace vanes which have been accidentally torn from a tire previously equipped with vanes. In such a case a portion of the sidewall of the tire at the location of the damaged vane may be removed and unvulcanized rubber cemented over the damaged area. The repair vane unit may then be cemented in place and vulcanized to the tire as hereinbefore described.

The non-reinforced margins of the vane unit being of gradually decreasing thickness and increasing stretchability toward their feathered edges, provide a good anchorage for the vane and provide a smooth surface blending into the sidewall of the tire to reduce resistance to airflow along the sidewalls of the tire while preventing separation from the tire at the edges of the unit by their thinness and high stretchability. The base provides a strong anchorage to the tire while sustaining forces transmitted through the hinge as a result of the flexing of the vanes in use.

Variations may be made without departing from the scope of the invention as it is defined by the following claims.

We claim:

1. A tire having a sidewall, and a vane unit vulcanized thereto, said unit comprising a substantially flat vulcanized body of resilient rubber-like material having a shallow recess in its exposed face, and a vane comprising resilient rubber-like material integral with said body seated in said recess and hinged to said body along one margin of said vane, said vane being arranged with its hinge line oblique to a radius of the tire.

2. A tire having a sidewall, and a vane unit vulcanized thereto, said unit comprising a substantially flat vulcanized body of resilient rubber-like material having a shallow recess in its exposed face, and a vane of cord-reinforced rubber-like material integral with said body seated in said recess and hinged to said body along one margin of said vane, said vane being arranged with its hinge line oblique to a radius of the tire.

RAYMOND J. HULL.
ROBERT W. HURSH.

REFERENCES CITED

The following references are of record in the file of this patent:

UNITED STATES PATENTS

| Number | Name | Date |
|---|---|---|
| 1,833,019 | Faucher | Nov. 24, 1931 |
| 1,992,665 | Hazell | Feb. 26, 1935 |
| 2,333,447 | Schippel | Nov. 2, 1943 |